United States Patent
Cooper et al.

(10) Patent No.: US 8,080,962 B2
(45) Date of Patent: Dec. 20, 2011

(54) MOTORISED BARRIER ROLLER

(75) Inventors: Andrew Paul Cooper, Rowlands Castle (GB); Victoria Louise Ford, Hampshire (GB)

(73) Assignee: Coopers Fire Limited

( * ) Notice: Subject to any disclaimer, the term of this patent is extended or adjusted under 35 U.S.C. 154(b) by 372 days.

(21) Appl. No.: 12/483,551

(22) Filed: Jun. 12, 2009

(65) Prior Publication Data

US 2009/0310264 A1    Dec. 17, 2009

(30) Foreign Application Priority Data

Jun. 12, 2008 (GB) .................................. 0810784.9

(51) Int. Cl.
*H02P 1/00* (2006.01)
*H02P 3/12* (2006.01)
*H02H 7/08* (2006.01)

(52) U.S. Cl. ........ 318/472; 318/280; 318/300; 318/445; 361/23

(58) Field of Classification Search .................. 318/300, 318/280, 283, 445, 465, 468, 472; 361/23–32
See application file for complete search history.

(56) References Cited

U.S. PATENT DOCUMENTS

| | | | | |
|---|---|---|---|---|
| 7,129,662 | B2 * | 10/2006 | D'ayot | 318/468 |
| 7,538,504 | B2 * | 5/2009 | D'Ayot | 318/280 |
| 7,692,398 | B2 * | 4/2010 | Bruno | 318/751 |
| 2006/0033460 | A1 * | 2/2006 | D'ayot | 318/280 |
| 2006/0132072 | A1 * | 6/2006 | D'Ayot | 318/283 |
| 2006/0284590 | A1 * | 12/2006 | Bruno | 318/812 |
| 2009/0258606 | A1 * | 10/2009 | Ramus | 455/77 |
| 2010/0127645 | A1 * | 5/2010 | Gronbach | 318/300 |

* cited by examiner

*Primary Examiner* — Paul Ip
(74) *Attorney, Agent, or Firm* — Jennifer Meredith, Esq.; Meredith & Keyhani, PLLC

(57) ABSTRACT

A fire or smoke barrier 1 has a curtain 2 deployed from a motorized roller 3 mounted in a head box 4. Remote from the head box and connected to the motor via a cable 5 is a motor controller circuit 6.

A short circuit protection circuit 9 is connected to the motor within the roller at the motor end of the cable 5. On the motor side of the circuit 9 is a retarder circuit 10 connected across the motor terminals.

The short circuit circuit comprises a pair of relays 11, 12, arranged with their normally open contacts 111,121 arranged in parallel. A drive voltage one 11 of the relays has its winding 112 across the input lines 14 of the circuit and the emf one 12 of the relays has its winding 122 across the output lines 15 of the circuit. The input lines 14 are connected to the cable lines 51,52 and the output lines 15 are connected to the motor terminals 16, via the retarder 10.

5 Claims, 4 Drawing Sheets

US 8,080,962 B2

MOTORISED BARRIER ROLLER

This application claims priority to Application Number 0810784.9 filed Jun. 12, 2008 in the United Kingdom entitled "Brake Arrangement" by inventors Andrew Paul Cooper and Victoria Louise Ford and applicant Coopers Fire Limited.

The present invention relates to a motorized barrier roller, in particular though not exclusively for a curtain of a fire or smoke barrier.

The motor of such a motorized roller is conventionally a DC, permanent magnet motor acting through a high reduction gearbox. Whilst alternatives are possible, such a motor is typically arranged to be power off brake off or power on brake on. A DC motor when rotated without power generates back-emf. If the curtain falls with the motor terminals open circuit, the back-emf has no load path, the motor is free to rotate and the curtain falls uncontrolledly and possibly dangerously. If the curtain falls with the motor terminals short circuited, the back-emf is shunted and braking torque is applied. This may be only small, but once multiplied by the reduction ratio and taking account the internal friction of the gearbox, the curtain will either not fall at all or will fall very slowly, so slowly indeed as to render the curtain and its barrier useless. As the barrier is designed to replace what would otherwise be a solid static fire barrier eg a wall it is essential that it moves to its fire operation position in the event of activation or any form of system failure or corruption. Thus neither failure to fall at all nor very slow fall should arise. The barrier is in place in case of life-safety emergency and many and various circumstances can cause emergencies and it is desirable to be able to mitigate as many eventualities as possible.

Open circuit failure and with it uncontrolled falling of the curtain is catered for in the motor control circuitry external to the motor under normal operation and circuitry inside the motor where it is protected by means of a speed retarder circuit incorporated in the roller. It acts to connect a resistance across the motor terminals in the event of the back-emf rising to an unacceptable level. This connection causes the motor to act as a brake and control the descent of the curtain. The degree of resistance and therefore speed can be adjusted. This principle can also be applied to an interan or external electromagnetic brake.

A further feature of our motorized rollers is the provision of an electromagnetic brake, applied to hold the roller stationary when the curtain has been wound to its up position and drive voltage has been disconnected from the motor. Emergencies of the type with which this invention is intended to deal involve removal of voltage from the brake. Normally this will be intentional in that a fire alarm condition will cause the motor controller to switch off the brake voltage and applied a controlling resistance across the motor or the brake for the back-emf to work against with the motor lowering the curtain in a controlled manner.

Therefore the particular situation with which this invention is concerned is the the unexpected shunting of the motor terminals by shorting of the wires connected thereto externally to the protected motor.

The object of the present invention is to provide a device capable overcoming a short circuit of any wiring between the device and any control equipment of dealing with a short circuit and enabling the curtain to descend at a controlled speed faster than that of a short circuit.

According to the invention there is provided a motorized barrier roller:
a DC electric drive motor mounted within the roller;
a drive cable passing into the roller, the cable having at least a motor drive pair of cores;
a short circuit protection circuit within the roller, connected between the cable and the electric motor, the circuit including a relay closed in driving operation of the motor and open circuit in event of short circuit in the cable of the motor drive pair of cables.

In one embodiment, the winding of the relay is connected across the drive cable pair of cores with the normally open contacts of the relay in line with one of the cores between its connection to the winding and the motor. Thus when a drive voltage is applied to the pair of cores, the relay closes and the voltage is applied to the motor.

If the pair of cores is short circuited, there is no voltage to close the relay and the short circuit does not stop the curtain from falling (once the brake, which will normally be in the motor, is released). Its rate of fall is preferably controlled in this instance by a speed retarder.

The voltage will normally be applied to the pair of cores by a motor control circuit. This controls not only application of voltage for winding up, but also application of resistance across the pair of cores to control the descent of the curtain. With the anti-short circuit relay arranged as above, there is no voltage to close the relay. Accordingly, a further relay is preferably provided, with its winding connected across the motor and its contacts connected in parallel with the contacts of the first relay. On release of the brake, the curtain begins to fall with the motor generating back-emf. This closes the back-emf relay and the motor controller can apply resistance to control the rate of descent.

In another embodiment, a normally open relay is provided in series with one of the motor lines. It is held closed by application of low voltage to the brake core. In event of short circuiting of all the cores, the low voltage is removed and the relay opens. The curtain then falls and the rate of descent is controlled by the speed retarder.

To help understanding of the invention, a specific embodiment thereof will now be described by way of example and with reference to the accompanying drawings, in which.

Figure 1:
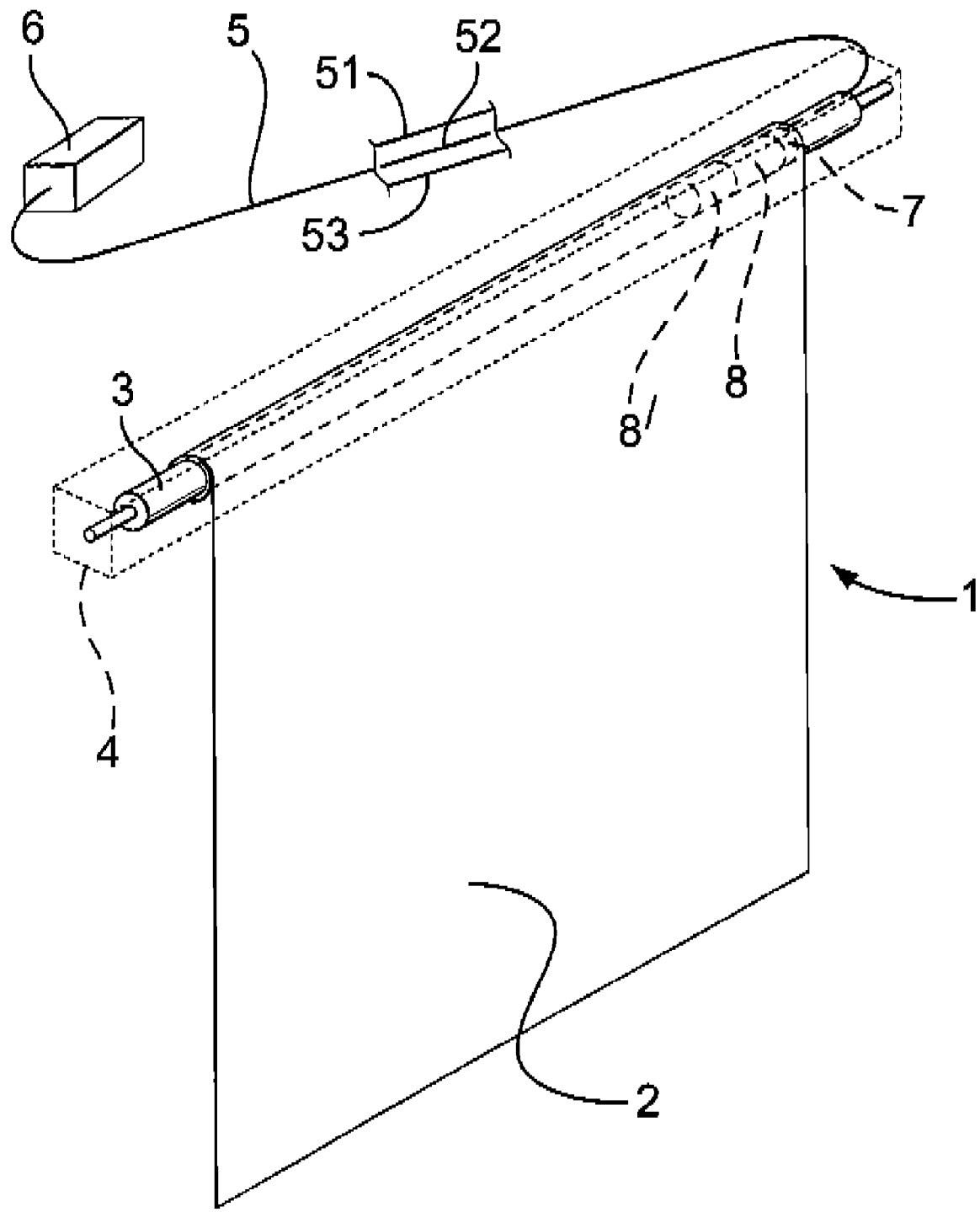
FIG. 1 is a perspective view of smoke or fire screen having a motorized roller in accordance with the invention.

Referring first to FIG. 1, a fire or smoke barrier 1 has a curtain 2 deployed from a motorized roller 3 mounted in a head box 4. Remote from the head box and connected to the motor via a cable 5 is a motor controller circuit 6. Insofar as this is conventional and supplied by us, it will not be described, beyond that it can:
apply or not voltage on core or line 53 for a brake 7 in the motor 8 housed in the roller 3, which can brake the curtain and indeed possibly regulate the rate of fall of the curtain,
apply or not voltage across cores or lines 51,52 for driving the motor 8 to raise the curtain and
apply or not a resistance across the cores or lines 51,52 for acting with the back-emf generated by the motor in free fall of the curtain, to regulate the rate of fall of the curtain.

A short circuit protection circuit 9 of the invention is connected to the cylindrical within the motor tube within the roller at the motor end of the cable 5. On the motor side of the circuit 9 is a retarder circuit 10 connected across the motor terminals. Again it is conventional, supplied by us and will not be described in detail here beyond that it can:

apply a resistance across the motor terminals in the event of the back-emf rising to approximately and typically 35 volts, to retard the motor and obviate free fall of the curtain, should the lines of the cable all be severed and open circuit, which releases the brake by removal of its application voltage.

One final conventional feature is that the motor per se, which is typically a DC permanent magnet motor, drives through a high reduction gear box 8', typically 100:1. Thus relatively modest rotational speed of the roller causes much higher speed rotation of the motor, and vice versa. Thus high back-emf is generated for low speed rotation of roller in free fall of the curtain. Since the gearbox is integral with the motor, it is not referred to again below and references to the motor included references to the motor and gearbox collectively as regards mechanical arrangement and drive of the roller.

Figure 2:
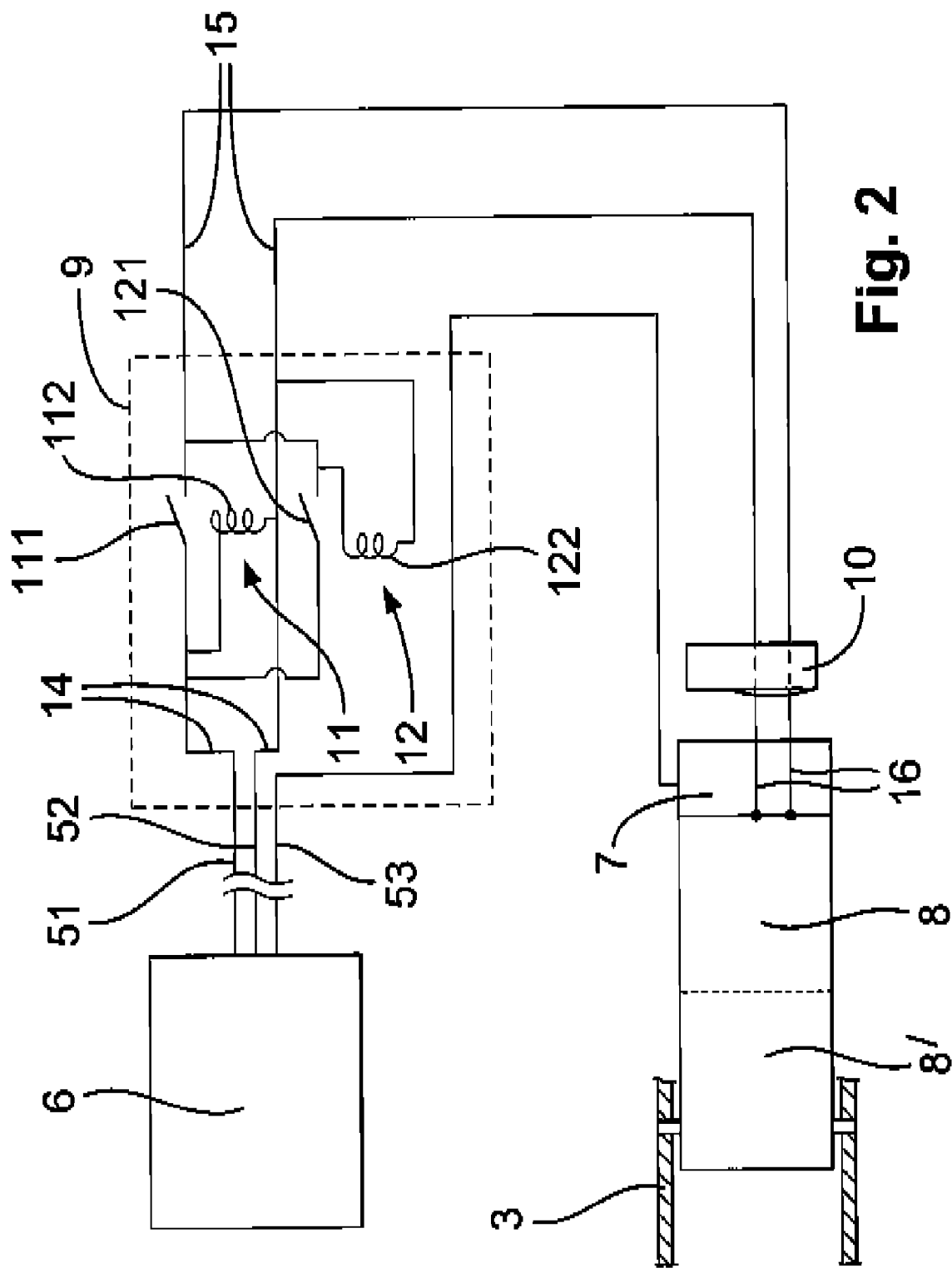
FIG. 2 is a first circuit diagram of a first short circuit protection circuit for the motorized roller of FIG. 1.

Turning now to FIG. 2, the short circuit comprises a pair of relays 11, 12, arranged with their normally open contacts 111,121 connected in parallel. A drive voltage one 11 of the relays has its winding 112 connected across the input lines 14 of the circuit and the emf one 12 of the relays has its winding 122 across the output lines 15 of the circuit. The input lines 14 are connected to the cable lines 51,52 and the output lines 15 are connected to the motor terminals 16, via the retarder 10.

For better understanding of the accommodation of the short circuit 9 in the motorized roller, the motor and gearbox, the conventional arrangement will be described. The roller has two shafts 21, normally held fast in the head box and carrying annular bearing blocks 22 to which the roller 3 is secured for rotation with respect to the shafts. The cable 5 passes into the shaft 21 at the motor end and through the bearing block 22 and a disc 23 fast with this shaft. A tubular motor housing 24 is fixed to this disc and extends inside the roller 3. Into the opposite end of the tube 24 a further disc 25 is fitted. Through this extends a drive shaft 26 to a roller drive disc 27. This is fast with the roller 3. The shaft 26 is the output shaft of the gearbox 8', which is secured to the disc 25. The gearbox 8' has the motor 8 is connected to it. It will be appreciated that the motor, gearbox and motor tube are all held stationary by the shaft 21.

The cable 5 terminates at the short circuit protection circuit 9, which is carried inside the disc 23. The speed retarder 10 is spaced from but carried with the protection circuit. Wires 15 lead from it to the motor and to the brake 7. This comprises an electromagnetic coil 28 and disc 29 at the distal end of the motor shaft 30.

In normal operation, with no drive voltage applied, both relays are open circuit. Application of drive voltage causes the drive relay to close. This applies voltage to the back-emf relay, which closes also. The cable lines 51,52 are now connected to the motor which can be driven—in practice for lifting the curtain, the motor controller having not applied voltage to the brake (if it had been applied in the down position of the curtain).

Also in normal operation, if the curtain is up, switching off the brake with no voltage applied to the motor results in the curtain beginning to fall, the relays being open. Once the back-emf rises, the back-emf relay closes and then the drive relay closes also with the back-emf applied to its windings. The motor controller can then control the speed of the motor and the descent of the curtain by application of resistance across the lines 51,52.

In emergency operation, with the curtain up and the lines 51,52 open circuit and the brake voltage accidentally removed, the curtain will fall. The back-emf relay will close, but this has no effect. The final descent speed will be determined by the speed retarder.

Figure 3:
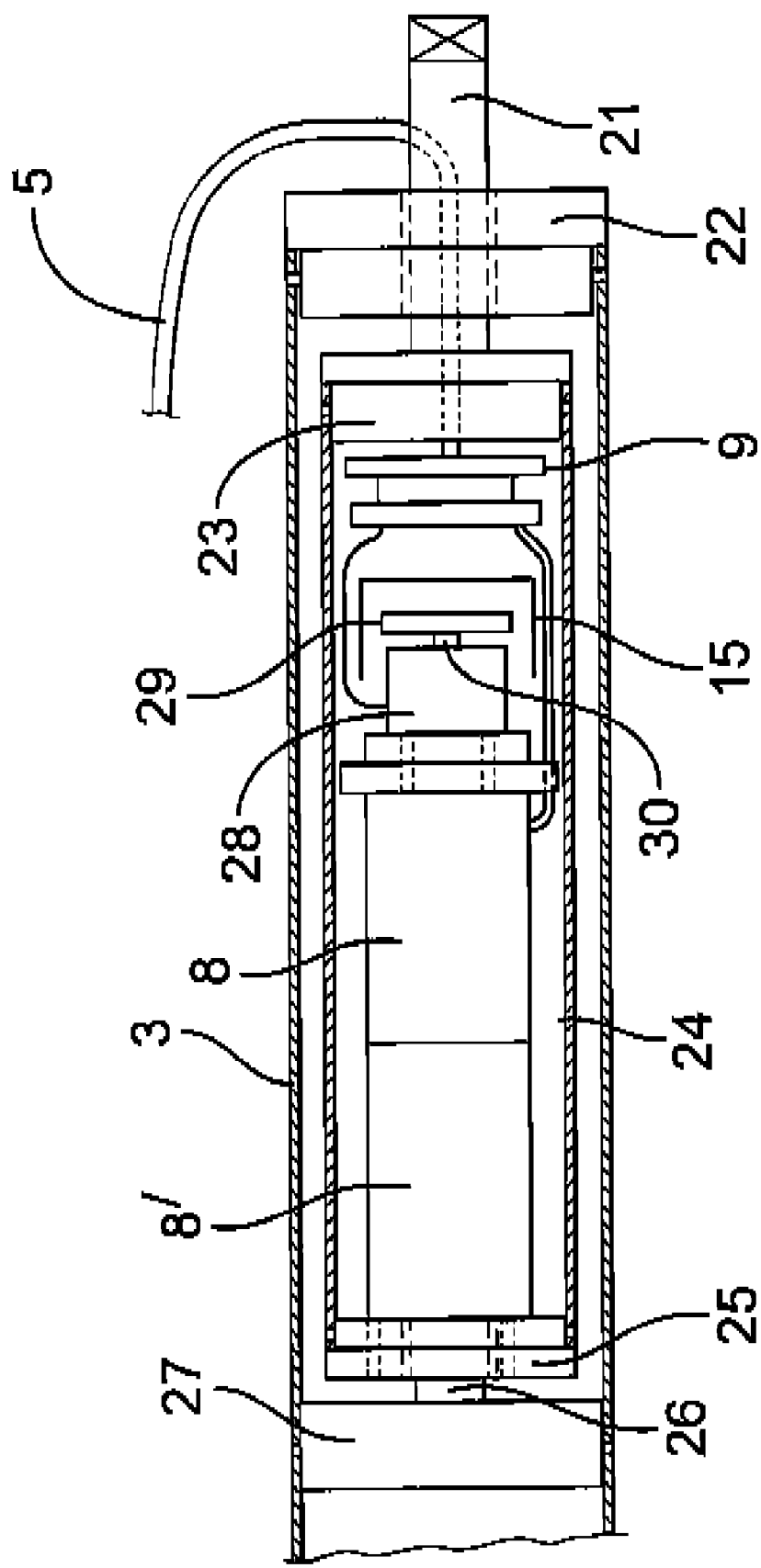
FIG. 3 is a cross-sectional view through the motor of the motorized roller.
Figure 4:
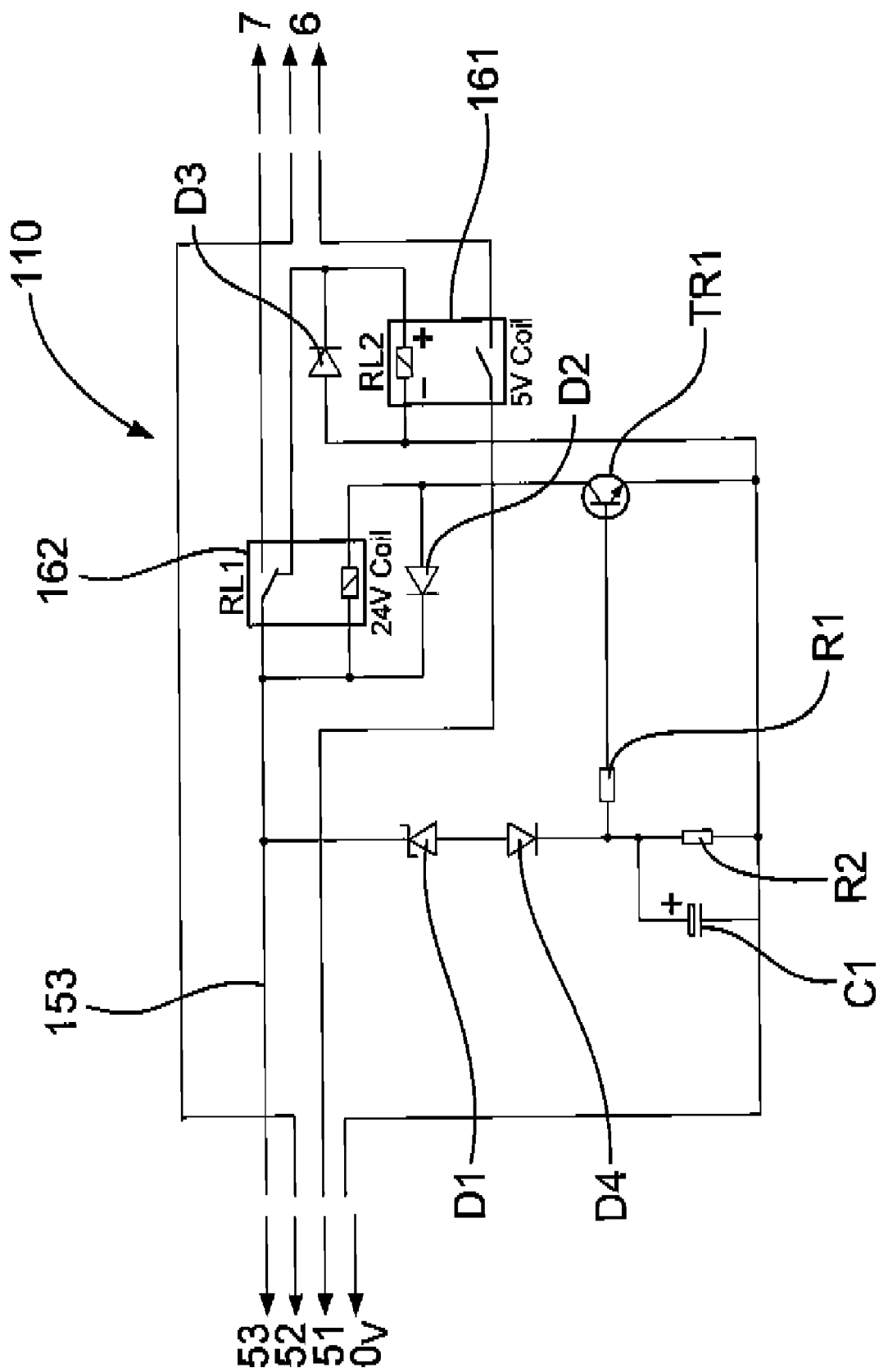
FIG. 4 is a second circuit diagram of a first short circuit protection circuit for the motorized roller of FIG. 1

Also in emergency operation, if the cable lines 51,52 are shorted together and the brake is switched off, the motor contacts will not be short circuited due to the relays being open. The back-emf will rise and the back-emf relay will close. This brakes the motor due to its contacts being shunted. The speed drops until the back-emf relay is no longer held closed. This cycle is repeated with the curtain descending in a controlled manner, Turning now to FIG. 3, a different circuit protection circuit 110 is shown. In this instance, the motor control circuit is modified to apply typically a permanent 5 volts across to the brake line 153, from a 5 volt line via a diode in the motor control circuit. The circuit includes a low voltage relay 161, which is normally open. On application of the 5 volts it closes the motor voltage line 151. Then the motor can be controlled in driving up or descent in like manner as described above, but only so long as the 5 volts are present.

When the brake line voltage rises to 24 volts, a relay 162 in it changes state allowing this voltage to pass to the brake. At the same time, the relay 161 then becomes open circuit.

In the event the cable cores being short circuited, the 5 volts is removed and the two relays go open circuit. The five volts is insufficient to engage the brake. The curtain falls under control of the speed retarder circuit.

Further details of this different circuit protection circuit 110 is as follows:

Zener diode D1 (15V) blocks the 5V supply from activating the base of a transistor TR1 at this time.

When the brake is energized a Pulse Width Modulated (PWM) voltage is fed to the brake from the motor controller. The return path is via 2-CN1. The voltage is 27V and exceeds the zener reverse breakdown voltage and provides base drive to TR1 via smoothing network C1, R2 and current limit resistor R1.

C1 is necessary to smooth the PWM voltage into a continuous voltage for TR1 base. R2 limits the current through the zener diode and also provides a discharge path for C1. D4 prevents C1 from prematurely discharging back through the brake supply during the 0V period of the PWM.

With TR1 base driven Relay 162 is energized. Relay 161 is de-energized and the motor is disconnected from the motor controller. This is fine as the motor is not being used at this time.

When the brake is released and the voltage on line 153 returns to 5V, relay 161 re-energizes and the motor is once again connected to the motor controller. The curtain descends to the down position under gravity. The motor controller controls the descent speed.

Diodes D2 and D3 are flywheel diodes that quench voltage spikes when the relays de-energize.

The invention claimed is:

1. A motorised barrier roller:
   a DC electric drive motor mounted within the roller;
   a drive cable passing into the roller, the cable having a motor drive pair of cores;
   a short circuit protection circuit within the roller, connected between the cable and the electric motor, the circuit including a relay closed in driving operation of the motor and open circuit in event of short circuit in the cable of the motor drive pair of cables.

2. A motorised barrier roller as claimed in claim 1, including a speed retarder circuit connected to contacts of the drive motor and an electromagnetic brake.

3. A motorised barrier roller as claimed in claim 1 or claim 2, wherein the winding of the relay is connected across the drive cable pair of cores with the normally open contacts of the relay in line with one of the cores between its connection to the is winding and the motor, whereby when a drive voltage is applied to the pair of cores, the relay closes and the voltage is applied to the motor.

4. A motorised barrier roller as claimed in claim 3, wherein a further relay is provided, with its winding connected across the motor and its contacts connected in parallel with the contacts of the first relay, whereby on release of the brake, the curtain begins to fall with the motor generating back-emf, which closes the back-emf relay for braking of the motor.

5. A motorised barrier roller as claimed in claim 2, wherein a normally open relay is provided in series with one of the motor lines and low voltage means is provided on a brake line for its closure, whereby in event of short circuiting of all the cores, the low voltage is removed, the relay opens and the the curtain then falls and the rate of descent is controlled by the speed retarder.

\* \* \* \* \*